United States Patent [19]

Nachmany

[11] Patent Number: 4,484,387

[45] Date of Patent: Nov. 27, 1984

[54] MACHINE TOOL BASE AND CARRIAGE SYSTEM

[76] Inventor: Israel Nachmany, 32 Hamaagal Str., Rimon, Kiryat Uno, 55000, Israel

[21] Appl. No.: 525,430

[22] Filed: Aug. 22, 1983

Related U.S. Application Data

[63] Continuation of Ser. No. 263,146, May 13, 1981, abandoned.

[30] Foreign Application Priority Data

May 16, 1980 [IL] Israel .................................. 60089

[51] Int. Cl.³ .......................................... B23Q 3/157
[52] U.S. Cl. .................................. 29/568; 409/137; 409/219
[58] Field of Search .................... 29/568, 26 A, 26 R, 29/27.1, 1 A; 409/137, 219, 220, 226, 235; 408/234, 35; 82/52, 2 R, 2 D

[56] References Cited

U.S. PATENT DOCUMENTS

| 958,243 | 5/1910 | Farwell | 29/1 A X |
|---|---|---|---|
| 3,376,788 | 4/1968 | Muller | 409/219 |
| 4,196,501 | 4/1980 | Shimajiri et al. | 29/568 X |

FOREIGN PATENT DOCUMENTS

| 76732 | 12/1948 | Czechoslovakia | 29/27.1 |
|---|---|---|---|
| 1250716 | 9/1967 | Fed. Rep. of Germany | 409/219 |
| 0132875 | 11/1978 | Japan | 29/568 |
| 82149 | 7/1981 | Japan | 409/137 |
| 626897 | 9/1978 | U.S.S.R. | 409/219 |

*Primary Examiner*—William R. Briggs
*Attorney, Agent, or Firm*—Robert B. Block; Lewis Anten

[57] ABSTRACT

A machine tool base and carriage system in which the base provides intersecting, vertical walls at its side margins each carrying and forming a rail having a head and toe pair defining bearing surfaces for carrying a respective workpiece or tool holding carriage slidably supported thereon for movement towards and away from the plane of the other wall respectively and in a horizontal plane. The base thus forms a single unitary triangular structure of horizontal operating arrangement, which may be integrally formed, and which presents the shortest possible bending moments for forces incurred during machining operations a kinematic mounting of the carriage to the base.

9 Claims, 4 Drawing Figures

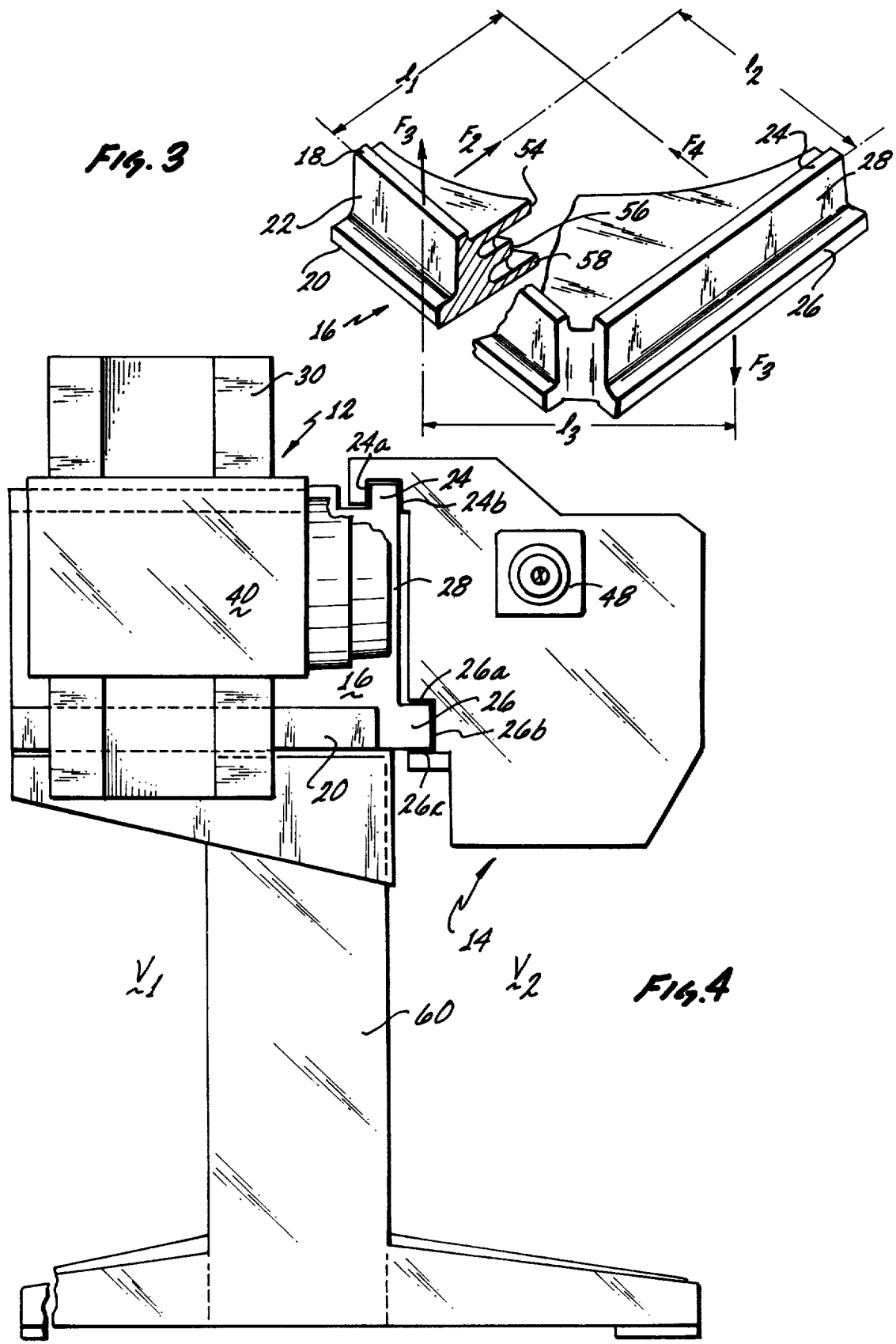

MACHINE TOOL BASE AND CARRIAGE SYSTEM

This is continuation of application Ser. No. 263,146, filed May 13, 1981, now abandoned.

Priority is claimed under the provisions of the International Conventions to applicant's Israeli application, No. 60,089, filed May 16, 1980, previously identified in the declaration herein.

BACKGROUND OF THE INVENTION

The present invention relates to machine tools and milling machines and more particularly to automatic milling machines generally known as machining centers capable of multifunction CNC milling operations. More specifically, the invention concerns an improved chassis or base structure and associated carriages for the tool holder and workpiece holder support for sliding motion relative to each other.

During machining of a workpiece thrust forces amounting up to 1000 Kg may be present between the workpiece holder assembly on the one hand and the tool holder assembly on the other hand, acting in various directions according to the machining process. Accepted precision standards require that during the machining of a workpiece having a length of 300 mm, the deflection should not exceed 0.01 mm. It can thus be appreciated that the accuracy requirements of assemblies and of the mounting thereof are extremely high, bearing in mind that the deflection of a beam under bending moments is proportional to the third power of its length.

The achievement of such extreme accuracy and machining reliability under static as well as dynamic working conditions dictates a base structure of high rigidity and extremely heavy structure. As a typical example, a machining center capable of machining a workpiece measuring about 300 mm in each direction necessitates a base structure weighing no less than 2 to 3 tons and measuring a floor space of approximately 3 square meters.

Mainly because of these factors, machine tools of the kind referred to require highly sophisticated manufacturing techniques and know how, and are in fact manufactured only by a few enterprises in the world and are highly expensive.

SUMMARY AND OBJECT OF THE INVENTION

It is therefore the general object of the present invention to provide a chassis construction for automatic machine tools which is of considerable lesser weight and facilitate relatively easy machining and assembly thereof.

It is a further object of the invention to mount the workpiece holder assembly and the tool holder assembly onto a unitary structure component.

It is a still further object of the present invention to design such unitary support member of the assemblies so that it will be capable of resisting bending and torsion stresses presented during the machining of a workpiece.

Accordingly, there is provided according to the general aspect of the invention, a machine tool particularly of the automatic machining center type, comprising a workpiece holder and a tool holder slidably mounted for respective Vertical X-axis, Longitudinal Y-axis and Cross Z-axis movements characterized by a base or block piece having at least two orthogonol planar faces, one of said faces being provided with means for slidably supporting said workpiece holder in the Y-axis direction and the other face being provided with means for slidably supporting said tool holder in the Z-axis direction and one of the slide means further including means for slidably supporting one of the tool holder or workpiece in the X direction.

According to one aspect of the invention the said workpiece holder is mounted on said one face intermediate a support member slidably supporting the workpiece holder in tne X-axis direction.

BRIEF DESCRIPTION OF THE DRAWINGS

FIG. 3 is an isometric view of a unitary mounting base or chassis constructed in accordance with the present invention for use in the machine tool of FIG. 2.

FIG. 4 is an elevational view of the machine tool of FIG. 2 taken from the workpiece side thereof and illustrating the carriage mounting feature.

DETAILED DESCRIPTION OF THE DRAWINGS

Figure 1:
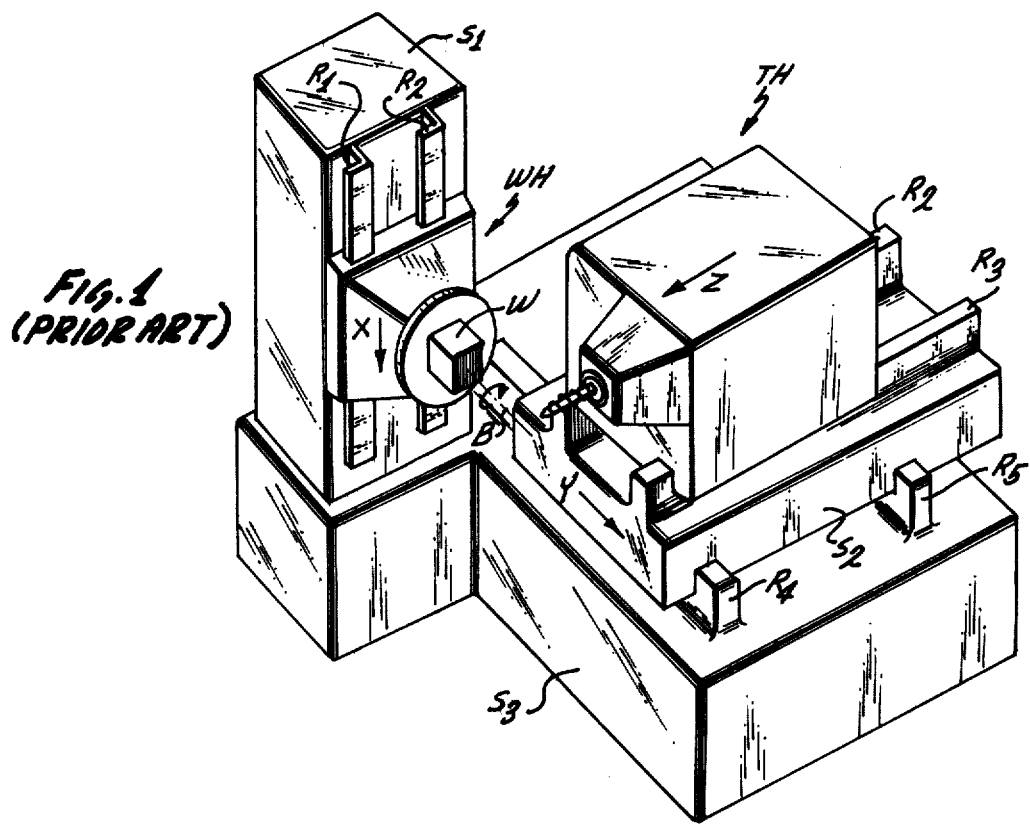
FIG. 1 is an isometric view of a conventional prior art machine tool and mounting structure.

In order to attain a better understanding of the objects and advantages of the present invention, reference shall be first made to FIG. 1, schematically illustrating the structure principles of conventional machines. As shown in FIG. 1 a typical machine of the kind referred to comprises a tool holder assembly generally indicated TH and a workpiece holder assembly generally indicated WH. The workpiece holder WH is slidably mounted by a pair of slides or rails $R_1$, $R_2$ extending vertically along a first fixed structure column $S_1$.

The tool holder TH is mounted on a structure carriage $S_2$ having sliding rails $R_2$ and $R_3$ extending horizontally in the direction of the tool holder's axis, and the carriage $S_2$ is slidably supported by rails $R_4$ and $R_5$ forming part of a general L-shaped base bed $S_3$ underlying and supporting the structures $S_2$ and $S_1$. It is therefore seen that the workpiece holder WH is slidable along an axis called "the Vertical X-axis", whereas the tool holder is capable of moving in a horizontal plane defined by "the Longitudinal Y-axis" and "the Cross Z-axis".

The workpiece proper, W, is capable of rotation about a fourth, "B-axis", as shown.

Figure 2:
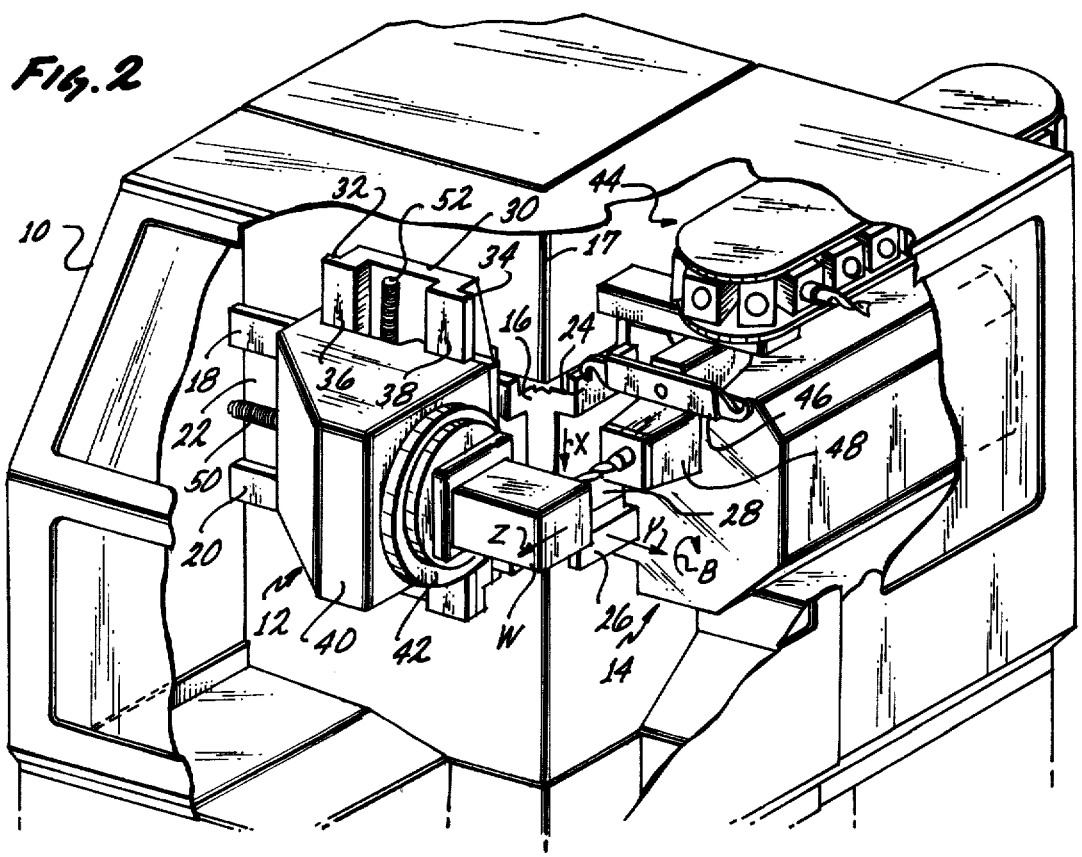
FIG. 2 is a perspective view, partially broken away, of a machine tool constructed in accordance with the present invention.

The machine tool base and carriage system of the present invention is shown in FIG. 2 and is contained within a housing 10. The system comprises, a workpiece holder assembly generally indicated 12 and a tool holder assembly generally indicated 14, assemblies both being supported by and slidably mounted on a unitary base or block designated 16, which is shown in detail in FIG. 3.

Bed or base 16 essentially comprises a rigid triangular block or chassis having adjacent vertical walls or surfaces intersecting orthogonally at the vertical line 17. Bed 16 includes a first pair of projecting rails 18 and 20 extending from the one vertical wall surface 22 thereof, and a second pair of rails 24 and 26 extending from the other vertical wall surface thereof indicated at 28.

Rails 18 and 20 cooperate with complementary recesses (not shown) formed in an intermediate supporting member 30. Member 30 is formed with two projecting slide rails 32 and 34 cooperating with complementary recesses 36 and 38, formed in housing 40 of workpiece holder 12. The holder 40 is provided with a face chuck 42 of any conventional type for holding workpiece W, which is thus rotatable about the axis marked B.

The tool holder 14 may comprise an extended tool store generally indicated 44 and associated means 46 for changing tools in the tool holder chuck 48, all as conventionally known in the art.

Finally, there are provided a first spindle screw 50 for feeding the intermediate member 30 in the direction of the Y-axis; a second spindle screw 52 for feeding the workpiece holder housing 40 in the direction of X-axis; and a third spindle screw (not shown) for sliding the tool holder assembly 14 in the direction of the Z-axis, as denoted in FIG. 2.

The operation and the various controls of the particular feeding movements, tool changing, and other functions of the machine are much the same as the conventional automatic machine tools and need not be described in this context.

Reference shall now be made to FIG. 3 illustrating a preferred embodiment of the above mentioned main support block 16. As shown, block 16 comprises the first face 22 orthognally extending with respect to face 28, both lying in perpendicular vertical planes and provided with railings 18 and 20 on the one side and 24 and 26 on the other side. The block 16 is preferably of a general triangular shape, hollow, made of cast metal, and having strengthing ribs such as 54, 56 and 58 to ensure stiffness against bending and/or shear stresses.

The major forces under which the various block portions are subjected to stresses are as follows: Bending force $F_1$ presenting a bending moment which equals to $F_1 \times l_1$ (or $F_2 \times l_2$); and the couple $F_3 \times l_3$, causing a torsion movement. It would be appreciated by those skilled in the art that from the standpoint of strength of materials the profiled block 16 is an optimal solution to such forces, minimizing the effective length of the moments levers. However, other block configurations may be designed along similar lines and considerations for obtaining the same results.

The unitary block supporting concept presented by the invention achieves another most important improvement in that the tool holder as well as the workpiece holder assemblies are compactly mounted substantially in the same horizontal plane, leaving therebeneath vacant spaces $V_1$, $V_2$ (FIG. 4) heretofore inevitably occupied by the base structures $S_3$ of FIG. 1. As schematically illustrated in FIG. 4 there is provided a central pedestal 60 which needs only to support the block 16 of FIGS. 3 and 2. Such vacant spaces would be used to install the various NC electronic and hydraulic systems for which extra space had been required according to conventional designs as afore exemplified.

The base bed construction may be further described as of the form of a pair of intersecting angle rails each having a lower flange extending outwardly from an upstanding vertical web. The lower flange terminates in a toe and the web extends upwardly to a rail head, the toe and rail head having surfaces for sliding support of carriages as will be described.

The angle rails are interconnected in a unitary casting by a plurality of horizontal webs or trusses extending the length of the rails having an increasing sectional dimension or depth as the rails converge and bounded by a circular arc at the outer extreme away from the rails. These horizontal webs are spaced in horizontal planes interspersed with hollow spaces to provide a hollow structure and to minimize the weight of the base while maintaining its strength.

As shown in FIG. 3, the rail head 24 is bare, presenting a rectangular cross-section with vertical inner and outer bearing surfaces 24a, 24b. The rail flange toe 26 is also bare presenting rectangular cross-section having at least an upper horizontal face 26a and an outer vertical face 26b spaced from the wall of the flange, and preferably is provided with a lower most face 26c directed downwardly.

Faces 24a, 24b of the rail head 24 and faces 26a, 26b, 26c of the rail toe 26 all serve to form guide bearings for the respective workpiece holder and tool holder carriages.

As will be appreciated, the several surface sets 24a,b and 26a,b,c collectively form the fixed open part and guideway of a closed pair sliding bearing mechanism of which the carriage is the closed part or slide. The complementary carriage slide surface sets are 14a, 14b and 15a, 15b, 15c.

This arrangement is particularly effective as a slide mechanism for a vertical face machine tool because of the precision with which it can be built and the rigidity it exhibits in response to forces arising during machine operation.

Additionally, by breaking each pair into spaced upper and lower sets, great rigidity against rotational movement and bending has been achieved. A like separation and rigidity is achieved in the direction of motion by the elongation of the bearing surfaces in those directions.

Thus, the present invention provides for a carriage on which is mounted a horizontal tool spindle carried by the vertical side wall of the adjacent machine tool base. This spindle and working tool works through the plane of the intersecting wall carrying the workpiece holder. The workpiece holder itself provides a vertical table which moves through the vertical plane of the horizontal spindle carriage motion. All of the above occurs because of the employment of a horizontally arranged base and carriage structure, mounted on vertical walls.

Now, considering the volume occupied by the several parts, it is seen that the quadrant occupied by the base is itself unavailable at the level of the machine. However, the quadrant of the vertical workpiece table, the quadrant of the carriage for the tool holder, and the quadrant of the carriage for the workpiece holder, are all free as is the region below these quadrants. Very importantly, the milling quadrant is free of support both above and below the region of milling so that swarf, chips and cutting fluid fall freely from the workpiece.

FIG. 3 is additionally marked with designators illustrating the various aspects of the invention which will now be summarized. Thus, the present invention machine tool includes the machine bed or block having first and second vertical walls facing outwardly and at right angles to each other to define a vertical line VL and the quadrants QB, QT, QW, QH as shown. The first and second vertical walls are arranged at right angles to each other to define the vertical line VL. As shown, the workpiece holder is arranged generally in quadrant QH for slidable movement in a vertical plane and for further slidable movement in a horizontal direction and includes means for holding and rotating the workpiece for movement in the X and Y axis directions within quadrant QW and also provides for rotation about the Z axis while in quadrant QW. The quadrant QW is vertically open below the workpiece for free fall of swarf and working fluids. The tool holder is generally operable by being mounted for sliding movement in a horizontal direction on the second vertical face and generally lies in the quadrant QT. The tool holder is provided with means for carrying a tool into the quadrant OW.

There has thus been outlined rather broadly the more important features of the invention, in order that the present contribution to the art could be better appreciated. Those skilled in the art will readily understand that the conception upon which this disclosure is based may readily be utilized as a basis for the designing of other structures for carrying out the several purposes of the invention. It is important therefore, that the claims appended hereto be regarded as including such equivalent constructions as they do not depart from the spirit and scope of the invention.

I claim:

1. Machine tool apparatus comprising a machine bed including a block having a first vertical wall facing outwardly from the block toward a quadrant QH and a second vertical wall facing outwardly from the block towards a second quadrant QT, said walls together defining a vertical line of intersection and further being oriented at right angles to each other to also define a set of four quadrants as seen in horizontal plan and about said vertical axis, including a work holder quadrant QH, a tool holder quadrant QT and a workpiece quadrant QW, said block occupying the remaining quadrant QB, a workpiece holder, means including spaced parallel and horizontal first guide rails associated to said first vertical face, means for slidably mounting the workpiece holder for at least horizontal and vertical movement on the first guide rails and in quadrant QH, said holder including means for carrying the workpiece for slidable movement in the X axis and in the Y axis, and further for rotationally moving the workpiece about the B axis aligned with the Y axis in quadrant QW, a tool holder, tool holder mounting means including spaced parallel horizontal second guide rails lying in and defining upper and lower horizontal planes with the respective ones of said first guide rails and a work zone in quadrant QW, said mounting means being operable in quadrant QT for slidably mounting a tool holder on the second guide rails for horizontal movement therein, said tool holder including means for carrying the tool for movement along and for rotating the tool about the Z axis in quadrant QW, said tool holder, work piece holder, and mounting means as so defined being constructed and arranged to operate in the general horizontal planar zone defined by the upper and lower planar and horizontal boundaries of the first and second guide rail means, said quadrant QW being vertically open below the workpiece for free fall of swarf and working fluids, and means associated with each wall for forming an upper guide having inner and outer side bearing surfaces, means associated with each wall for forming lower guides having an upper bearing surface, a side bearing surface, and a lower bearing surface, said outer surfaces of said upper guide and said side surface of said lower guide defining accurately parallel surfaces with respect to each other in the same or spaced parallel planes, each of said mounting means forming carriages having supporting wall surfaces defining slide bearing surfaces for mating with the respective with ones of said side wall surfaces.

2. The apparatus of claim 1 wherein said workpiece holder is mounted on an support member slidably supporting the workpiece holder in the X-axis direction.

3. The apparatus of claim 1 wherein said tool holder is mounted on a support member slidably supporting the tool holder in the Z-axis direction.

4. The apparatus of claim 1 wherein said means for slidably supporting comprises at least one rail projecting from and extending along each of said faces, cooperating with complementary elongated recesses formed in said workpiece holder and tool holder, respectively.

5. The machine tool as in claim 1 in which said bed comprises a member of triangular form having vertical sidewalls meeting at right angles to each other, horizontal base wall means forming trusses joining vertical side walls to form a support structure therewith.

6. The apparatus of claim 1 including an endless chain tool storage means.

7. The apparatus of claim 1 wherein said block piece is of a generally triangular shape.

8. The apparatus of claim 1 wherein said block piece is hollow.

9. A machine tool bed and carriage system as in claim 1 in which said several guide surfaces further comprise an upper set and a lower set which together form a closed pair, the lower set having one horizontal surface for bearing the weight of the carriage.

* * * * *